Nov. 4, 1958 L. SERVANTY 2,859,003
AERODYNE

Filed Feb. 13, 1956 6 Sheets-Sheet 1

Inventor
L. Servanty
By Glascock Downing Seebold
Attys.

United States Patent Office 2,859,003
Patented Nov. 4, 1958

2,859,003

AERODYNE

Lucien Servanty, Paris, France, assignor to Societe Nationale de Constructions Aeronautiques du Sud-Ouest, Paris, France, a French company Application February 13, 1956, Serial No. 565,249

Claims priority, application France February 18, 1955

21 Claims. (Cl. 244—12)

This invention relates to aerodynes of the type propelled by several reaction engines, hereafter called "reaction jets," whatever their nature, turbo-jets, ram jets, rockets, and so on.

It is well known that the directional torques generated for a given deflection of the control surfaces decrease with the speed.

This is the reason why it has been proposed, in order to increase the manoeuvrability of a reaction aerodyne at low speed to control the orientation of the gas jets, the directional torque generated for a given deflection of a jet increasing as the speed decreases.

Moreover, the efficiency of both types of steering means is obviously a direct function of the longitudinal leverage through which they act on the aerodyne.

Furthermore, in the transonic range of speed, it is interesting to dispose of control surfaces adapted to be oriented as a whole, instead of the conventional rudders, the deflection of which has for its function to vary the aerodynamic profile of the control surface comprising the said rudder and a fixed pin.

Now, at very high speeds, it is essential that the aspect ratio of the airfoils be maintained under certain limits.

Finally, the steering and elevating controls of an aerodyne require at least three tail control surfaces, two of which are often confined in one single plane (elevator of the conventional airplanes).

The main object of the invention is to provide an aerodyne having an elongated fuselage carrying at one end, e. g. on the tail, at least three airfoils orientable as a whole, each on either side of a diametral plane of the fuselage and each carrying a reaction jet fixedly secured along its tip edge and, at its other end, e. g. toward its nose additional airfoils completing the lifting action of said orientable surfaces.

The aerodyne, according to the invention, owing to the combined and simultaneously controlled directional actions of its orientable airfoils and orientable jets, located at a considerable distance from the centre of gravity, offers a remarkable controllability within an extremely wide range of speeds.

The behavior of the aerodyne is excellent in the transonic range of speeds, due to the fact that the bodily pivotable control surfaces avoid the inherent drawback of hinged control surfaces at high speeds, namely, to become inoperative, since such conventional hinged surfaces are always located in a zone of turbulent airflow behind the fixed surface (fin) to which they are hinged, and also because the deflection of such hinged control surfaces may exert such a torsional force upon the fixed surface to which they are hinged that the desired control effect will just be reversed. Furthermore, the lifting action may be distributed on the orientable and fixed airfoils, which permits limiting the aspect ratio of the whole wing structure.

Another object of the invention is to provide in an aerodyne of the type described three orientable airfoils as defined above angularly spaced by more than 90° and one of which is the bisectrix of the external dihedron of the two other.

With this arrangement, if in normal flight the bisecting airfoil is maintained in a vertical position, the said airfoil may be used as a steering rudder, the two other being used either as an elevator or as roll control surfaces. The aerodyne then requires no additional control surface.

The piloting of such an aerodyne may be effected by means of an extremely simple system of controls such as that described in the application filed on February 17, 1953, Serial Number 337,406 for "Aircraft," by the applicant.

Still another object of the invention is to arrange, in an aerodyne of the type described, the orientable airfoils with equal angular spacing.

This arrangement permits to fly horizontally with any transversal attitude.

Still a further object of the invention is to design an aerodyne of the type described having three adjustable tail airfoils spaced by 120° and three complementary front fixed airfoils also spaced by 120°, but shifted by 60° with respect to the adjustable airfoils.

With this construction, the aerodyne wakes of the front airfoils do not interfere with the tail surfaces.

The aerodyne according to the invention offers a high degree of natural stability at all speeds, on the one hand for small incidence angles (from 0 to about 15°) and, on the other hand, for great incidence angles (from about 60 to 90°).

Still another object of the invention is to complete the above described aerodyne by a stabilizing system capable of acting on the adjustable airfoils in response to variation of the angle of incidence, in particular between the two above defined ranges of natural stability to automatically maintain a positive incidence of the aerodyne at any speed and independently of any previous action of the orientable airfoils.

It is thus possible, if the aerodyne is equipped with reaction jets capable of generating a thrust slightly exceeding the overall weight, to fly with any positive incidence from 0 to 90° within a predetermined range of speed. In particular, it is then possible to ensure take-off and landing of the aerodyne, at a speed as low as desired, in vertical or at least substantially vertical flight attitude.

It is therefore a further object of the invention to equip an aerodyne of the type described with reaction jets capable of generating such a thrust and to complete the structure of the fuselage by a landing system capable of supporting the aerodyne on the ground with its tail down such as, for example, a shock-absorbing tripod, adjustable if desired, to permit a slight inclination of the aerodyne before take-off, in particular to orientate the same against the wind.

The aerodyne according to the invention resolves the problem of take-off (and landing) without displacement on the ground, without necessitating a prohibitive power since the said aerodyne may be from substantially vertical into substantially horizontal flight attitude at a low altitude without losing its stability whereupon the jets are aided, as in convenional reaction aircraft, by the lifting action on the airfoils.

In other words, not only the thrust of the jets needs be but slightly superior to the overall weight but the time during which they have to sustain the aerodyne without being aided by the aerodynamic action on the airfoils may be reduced to a short period after take-off or before landing.

Other objects and advantages of the invention will be apparent from the following detailed description, together with the accompanying drawings, submitted for purposes of illustration only and not intended to define the scope of the invention, reference being had for that purpose to the subjoined claims.

Figure 1:
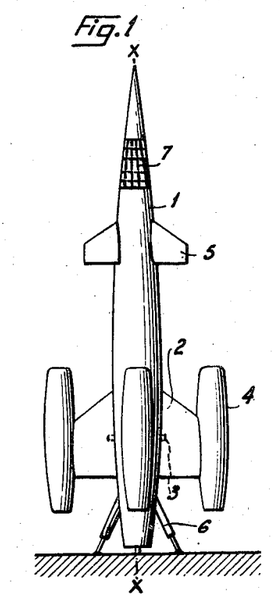
Figures 1 and 2 are elevational views, in two perpendicular planes of an aerodyne according to the invention.
Figure 2:
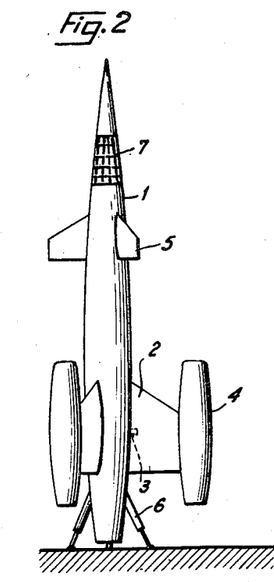
Figure 3:
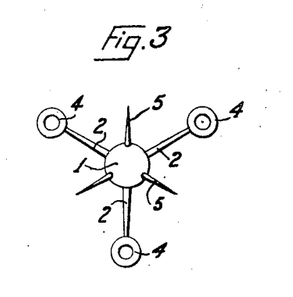
Figure 3 is a top view of the same.

In the example shown in Figures 1, 2 and 3, the aerodyne according to the invention comprises a spindle-fuselage 1 shaped externally constituting a revolution body around its main axis XX. In the vicinity of its tail, the fuselage 1 carries three adjustable airfoils 2 of same size and shape angularly spaced by 120° and extending around the axis XX in star-like fashion; each one of the airfoils 2 is orientable, as a whole, around a pivot 3 substantially perpendicular to the axis XX. In its mid-orientation, each airfoil 2 extends in a plane containing the axis XX. On the tip of the airfoil 2 is fixedly secured a reaction-jet 4, the axis of which is parallel (in said mid position of the associated airfoil) to the axis XX. In the example shown, the fuselage further carries, towards its nose, additional fixed airfoils 5 smaller than the airfoils 2 and each extending, in the example shown (see Fig. 3), in the bisecting plane of the dihedron formed by the two adjacent airfoils 2.

On the ground, the aerodyne is supported by an adjustable tripod 6; in each leg of the same is incorporated a shock-absorber. This tripod supports the aerodyne by take-off and landing, in a substantially vertical position slightly inclinable in any direction.

However, to permit, in case of emergency, horizontal landing of the aerodyne, the distance between the axis XX and the tip of each fixed airfoil 5 is, as shown in Figure 3, equal to the apothem of the equilateral triangle enveloping the cross-section of the aerodyne. Owing to this arrangement, the aerodyne is capable of landing on the ground in a horizontal flight attitude (crash-landing).

In the constructive embodiment shown in the drawings, the fuselage 1 is provided with a transparent section 7 registering with the cockpit of the pilot.

Figure 4:
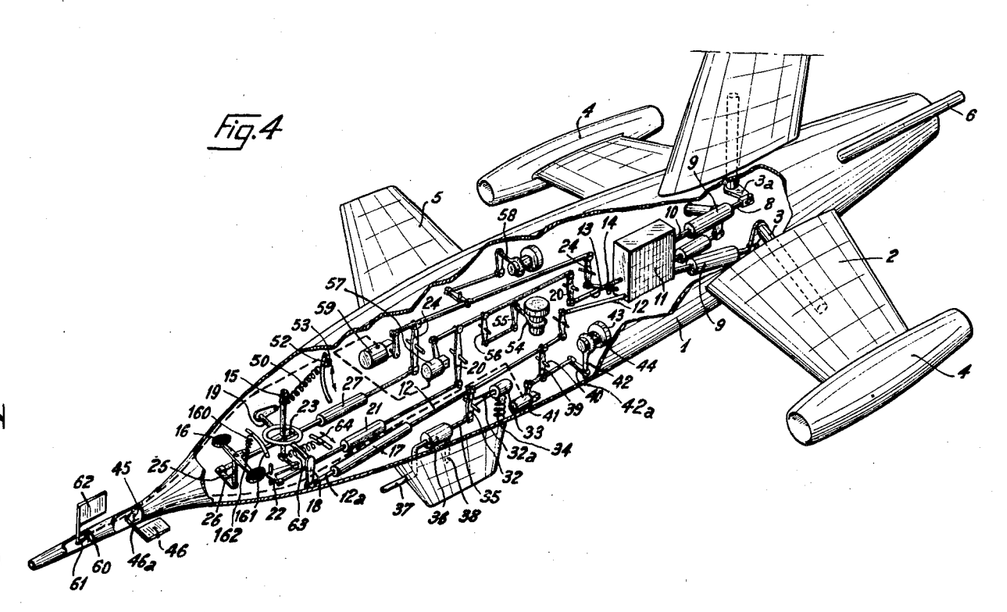
Figure 4 is a perspective view showing an illustrative arrangement of the controls and stabilizing system of such an aerodyne.
Figures 5, 6, 8:
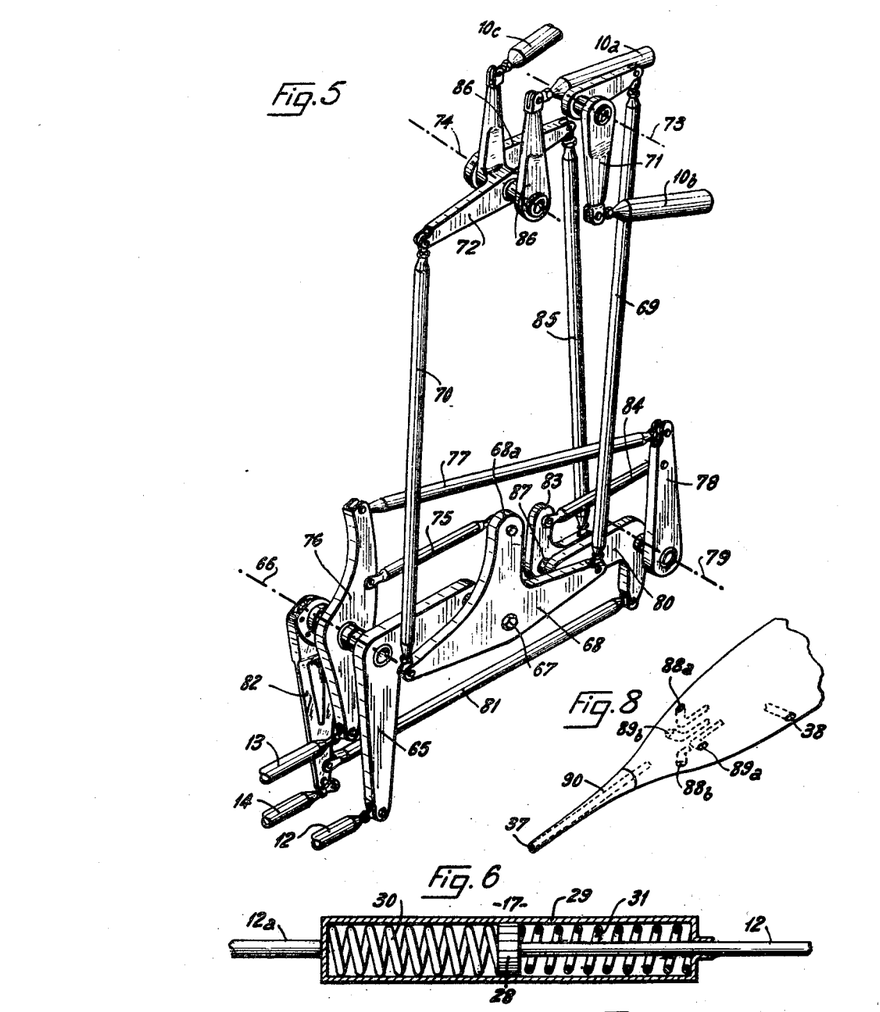
Figure 5 is an enlarged perspective view of a detail of Figure 4.
Figure 6 is an axial sectional view of a device ensuring an elastic interconnection betwen a pilot control and the stabilizing system.
Figure 8 shows an alternative construction of the nose of the aerodyne.

Figure 4 is an illustration of the general lay-out of the pilot controls and stabilizing system of an aerodyne according to the invention. The scale of the diagram being strongly exaggerated for the sake of clearness each airfoil pivot 3 (cf. Figures 1 and 2) (hollowed to accommodate controls and, if required, fuel feeding ducts for the associated reaction-jet 4) carries a crank-arm 3a articulated on the rod 8 of an irreversible jack 9 of any suitable known type, the feeding system of which is not shown in the drawing. In the case of hydraulic jacks, each one of them is controlled by a rod 10 actuated by a "mixing" linkage 11 diagrammatically shown in Figure 4 in the shape of a box, the details of which are shown in Figure 5. As known, in such irreversible hydraulic jacks, any displacement of a rod 10 causes a corresponding displacement of the associated rod 8 e. g. equal and in the same direction while, when the said rod 10 is stationary, the associated rod 8 is prevented both from moving and from transmitting forces to the rod 10. In the mixing linkage of Figure 5, there are provided three inlet rods 12, 13 and 14, corresponding to the three basic controls required for piloting an aerodyne, viz. elevating, steering and rolling controls. Through suitable links, the motion of the rods 12 and 13 is made responsive to the position of the pilot-stick 15, while the motion of the rod 14 is controlled by the steering-pedals 16. For this purpose, the rod 12 is interconnected through an elastic system 17 to a crank-arm 18 keyed on the transverse pivoting axis 19 of the pilot stick 15. The rod 13 is interconnected through levers 20 and an elastic system 21 with a bell-crank lever 22 actuated from the lower end of the pilot stick when the same is pivoted around a longitudinal axis 23 (swivel joint). Finally, the rod 14 is interconnected through levers 24 and elastic system 27 to a crank-arm 25 keyed on the pivoting axis 26 of the steering-pedal bar 16.

The design of the elastic systems 17, 21 and 27 is shown in Figure 6.

For example, the rod 12, leading to the mixing linkage 11, carries a piston 28 slidably mounted in a cylinder 29 fixedly secured on a rod 12a directly connected to the relevant pilot control. The piston 28 is sandwiched between two compression springs 30 and 31 of equal or different calibrations which are, thus, interposed between the movable rods 12 and 12a. The said springs thus constitute a damping means for the control actions exerted by the pilot, so that the actuated rod e. g. 12 may be imparted with a certain amplitude of displacement without material reaction for the pilot himself.

The elevating control (rod 12) is acted upon, between the mixing-linkage 11 and the elastic system 17, by means capable of generating forces as a function of the normal acceleration, the speed of flight, the angle of incidence and the pitch angular speed of the aerodyne.

The rolling control (rod 13) is acted upon in similar conditions, i. e. between the mixing linkage and the elastic system 21, by means generating forces as a function of the angle of side-slip and of the roll angular speed of the aerodyne.

Finally, the steering control (rod 14) is actuated in similar conditions by devices generating forces as a function of the side-slip angle or of changes in the direction of flight of the aerodyne.

The arrangements described in the last three paragraphs are diagrammatically shown in Figure 4.

At a point of the rod 12 is secured one end of a lever pivotally mounted around a transverse axis carrying on an auxiliary arm 32a, a weight 33 balanced by a spring 34. This weight constitutes an accelerometer responsive to normal accelerations and generating forces proportional thereto. On the same lever is articulated the rod 35 of a piston slidably mounted in a cylinder 36. The front compartment (in the drawing) of the said cylinder receives, through an air intake 37 opening axially, the overall air pressure, while another air-intake 38 opening at right-angles to the first one, supplies the rear compartment of the cylinder with the static air pressure. Thus, the said piston is subjected to a force proportional to the dynamic air-pressure, i. e. to the difference between the overall pressure and the static pressure. In other words, this piston is capable of generating forces which are a function of the component of the aerodyne speed taken along its longitudinal axis.

On the rod 12 is further articulated a second lever 39 also pivoted around a transverse axis 40, this lever being further articulated on connecting rods linked, on the one hand, with an electric apparatus 41 capable of generating a force (or a torque) as a function of the voltage or current therethrough (such as a sucking coil electro-magnet or an electro-motor) and, on the other hand, to a gyrometer constituted by a gyro-rotor 43 mounted in a gimbal ring carried on the vertical axis 42.

As well known, when the position in space of such a gyro-rotor is varied upon pitch motion of the aerodyne, it reacts on the vertical axis 42 and the latter actuates the crank arm 42a and, hence, the lever 39 and the control 12.

The electro apparatus 41 is controlled through a follow-up system from a potentiometer 45, the sliding contact arm of which is keyed on the axis 46a of a wind vane 46, the orientation of which is determined by the direction of the relative wind. Since the axis 46a extends transversely, the variations of the inclination of the wind-vane 46 correspond to the variations of the angle of incidence.

Figure 7A:
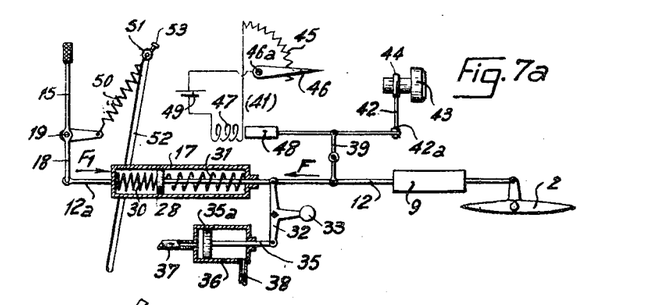
Figures 7a, 7b and 7c are diagrammatical views of the elevating control device of the aerodyne.
Figures 7B, 7C, 14:
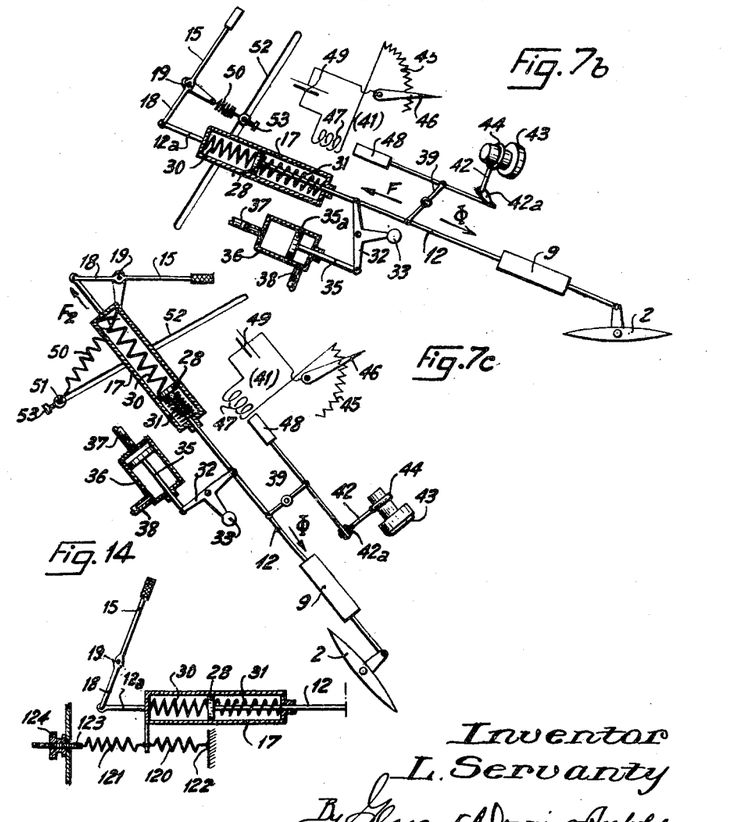
Figure 14 is a diagrammatic sectional view of an alternative embodiment of compensating springs.

The Figures 7a, 7b and 7c illustrate diagrammatically the operation of those parts of the above described arrangements, which are affected to elevating control purposes.

For the sake of illustration, the electric apparatus 41 has been shown in the diagrammatic shape of the sucking coil 47 of an electro-magnet fed from a current source 49 in series with the potentiometer 45.

As the aerodyne flies horizontally at a high speed with a very small angle of incidence, the energizing current in said electro-magnet is weak, so that the lever 39 solid with the plunger 48 exerts but reduced forces on the rod 12. The gyrometer then exerts no action on the lever 39; however, the air-dynamic pressure is strong, so that the piston 35a exerts a considerable thrust on the lever 32, the rod 12 thus being subjected to a force directed along arrow F. This force, through the piston 28 in the cylinder 17, tends to compress the spring 30 while releasing the spring 31. In these conditions, the pilot-stick 15 would be strongly repelled towards the pilot if it were not also subjected to the action of a long spring 50 interposed between said stick and a sliding block 51 movable along a slide-way 52, e. g. under the control of a knob 53 to be actuated by the pilot (these parts are also shown in Figure 4).

When the spring 50 is adjusted as shown in Figure 7a, the pilot stick 15 is held in vertical position and the component $F_1$ of this spring balances the thrust F of the rod 12.

In these conditions, the pilot-stick being in its normal position, the aerodyne flies horizontally, even if the pilot does not act on his stick at all, since, as will be easily understood, the weight 33 and the piston 35a then transmit through the rod 12 and the irreversible jack 9 stabilizing actions to the orientable airfoil 2. If the pilot nevertheless holds his stick, these instantaneous small amplitude reactions are transmitted to him but through the springs 30—31 so that he feels them but partly. However, he has the possibility, by acting on his stick, to control the orientable airfoil 2 by displacing, by means of his stick, the cylinder 17. Since the forces F and $F_1$ balance each other and since the position of the piston 28 in the cylinder 17 is determined by this mutual balance, the action of the stick is integrally transmitted to the orientable airfoil 2.

As the speed of the aerodyne is slowed down, it is still capable of flying horizontally with an attitude inclined on the horizontal (Fig. 7b). In these conditions, the angle of incidence increases and, hence, the attractive force exerted by the sucking coil 47 on the plunger 48 also increases, so that the force $\Phi$ supplied by the incidence responsive device (41) counteracts the force F then reduced due to the decreasing dynamic pressure and the strong inclination of the aerodyne, so that the resulting force acting on the rod 12 tends to become nil. As a result, the piston 28 returns towards its mid position in cylinder 17 and the equilibrium of the pilot-stick 15 is obtained by reducing the action of the spring 50 by a displacement of the sliding knob 53 towards the centre of the slide-way 52.

Finally (Figure 7c), as the speed is still more reduced and the nosing-up still more accentuated, the variable resistor of the potentiometer 45 is short-circuited nearly along its whole length, the action of the electro-magnet 47 on the plunger 48 becomes very strong and, hence, the force $\Phi$ is made considerable while the force F practically becomes nil. The spring 31 is then compressed at a maximum if the pilot-stick 15 has been brought in the strongly inclined position corresponding to this flight attitude. To hold the stick in this position, it is necessary to further displace the sliding knob 53 along the slide-way 52, so that the spring 50 exerts a force $F_2$ capable of balancing the force $\Phi$. However, due to the elongation of the rod 12, 12a, in spite of the strongly inclined position of the stick, the deflection of the orientable airfoil 2 is reduced, so that the reaction-jet supported by the said airfoil is oriented anew in a direction substantially parallel to the axis XX of the aerodyne. Since the speed is then strongly reduced, the stabilizing and piloting no more take place by the aerodynamic actions exerted on the airfoil 2, but under adjustment of the reaction-jet orientation by means of the pilot-stick 15 and/or under the stabilizing action of the lever 39 (in response to variation of incidence or under the control of the gyrometer 43).

The above described arrangement has the following advantages.

(1) To a given position of the pilot-stick 15 (for a given thrust of the reaction-jets and for a predetermined altitude) corresponds a well-defined flight attitude of the aerodyne and a well-defined speed of flight.

(2) The displacement of the pilot-stick 15 is monotonic; in other words, a displacement in a given direction (e. g. rearwardly of the stick always causes a variation of same kind of the pitch flight attitude of the aerodyne (e. g. nosing up).

(3) The displacement of the sliding knob 53, completing the displacement of the stick, is also monotonic so that easy piloting may be obtained by a suitable adjustment of said sliding knob.

Alternatively, as shown in Figure 14, the spring 50 and the sliding knob 53 may be replaced by a spring (or better by two counteracting springs 120 and 121) extending in a direction parallel to the rod 12—12a and the axis of the cylinder 17.

Said springs are anchored, at one end, on said rod (or cylinder) while the opposite end of the spring 120 is anchored on a fixed point 122 and while the opposite end of the spring 121 is anchored on a threaded rod 123 which may be adjusted longitudinally by means of a nut 124. The rotation of said nut 124, that varies in direction and magnitude the force acting upon the assembly 12—12a—17 is thus equivalent to the displacement of the sliding knob 53.

(4) The sliding knob 53 and the spring 50 (or the springs 120 and 121 and the nut 124) are equivalent to a tab holding the stick in the position chosen by the pilot, the flight attitude of the aerodyne being corrected at each instant (without any intervention of the pilot) by the stabilizing system.

(5) Finally, in the said stabilizing system, the parts responsive to air dynamic pressure and normal acceleration have a prevailing action during high speed flight, while the parts responsive to the variations of the angle of incidence and the speed of variation of the angle of pitch have a prevailing action during low speed flights.

As shown in Figure 7b, the gyrometer 43 is, in the example shown, somewhat influenced by the variation of incidence but this interference, which practically intervenes only at average speeds, has for only results a comparatively small variation of the sensitivity of the gyrometer. Moreover, the deflection of the airfoils 2 is always reduced, so that the section 12 of the linkage undergoes, as a matter of fact, but small longitudinal displacements. With an aerodyne of the type shown in the drawings flying at supersonic speeds, a very small deflection of the orientable airfoils 2 suffices to obtain important aerodynamic stresses. At low speeds (the aerodyne being strongly inclined) for which piloting is obtained by varying the orientation of the reaction-jets, due to the considerable leverage of the same, an important piloting torque is also obtained for a small deflection of the airfoils. This torque is, furthermore, directly proportional to the sine of the angle of orientation and it is to be noted that the said torque builds up without any delay as soon as a deflection takes place.

Finally, due to the action of the mixing-linkage which, as exposed hereunder, combines the various actions of the orientable airfoils, an accurate regulation of the thrust of the various reaction-jets is not necessary, since a variation in the thrust of one of them is corrected by a corresponding deflection of the orientable airfoils. In particular, it may be shown that a deflection of an airfoil of about 1°, is capable of balancing a thrust discrepancy of one of the jets with respect to both other ones by about 1.5%. In practice, within the limits of deflection of the orientable airfoils, it is possible to balance thrust discrepancies up to 10%.

Similarly to the elevating control, operation described above, the rolling control (rod 13) is subjected, on the one hand, to the action of a roll gyrometer 54 (through the crank arm 55 and a lever 56) and, on the other hand, to the action of an electric apparatus 57.

Similarly, for the steering control (rod 14), there are provided a yaw gyrometer 58 and an electric apparatus 59.

The two electric apparatus 57 and 59 are both controlled through an electric follow-up system from a potentiometer 60 swept by a sliding contact arm 61 driven from a side-slip wind wane 62 the axis of which extends at right angles to that of the wind vane 46. The apparatus 57 and 59 may be constituted by sucking coil electromagnets, as diagrammatically shown in Figures 7a and 7c for the apparatus 41.

In the aerodyne according to the invention both steering and rolling controls are monotonic without any special artificial means. However, to facilitate stabilizing, there are provided, for these controls, elastic devices 21 and 27 similar to the device 17. Tabs, similar to the tab 50, may be also provided for these controls. In Figure 4, these tabs are diagrammatically shown, for the steering pedal arm 16, under the shape of a spring 160, one anchored end of which may be displaced under the control of a sliding knob adjustable along a slide-way 161 and the other end of which is fixedly anchored on a crank-pin 162 secured on the steering pedal arm 16. For the rolling control, a spring 63 is anchored at the end of the pilot-stick and on a sliding knob adjustable along a slide-way 64. By suitably adjusting the sliding-knobs on the slide-ways 161 and 64, the permanent stresses imparted to the steering-pedals and the pilot-stick (for rolling purposes) due to an extraneous action of the aerodyne (wind) or an internal cause (out-of-balance of the reaction-jets) may be neutralized.

Owing to the arrangement of the orientable airfoils 2 in the shape of a three-arm star the various controls 12, 13 and 14 (elevation, rolling and steering) necessarily have, to a certain extent, a simultaneous action on several of the said airfoils. This result is obtained by means of the mixing-linkage shown in Figure 5. Such a mixing-linkage would not be indispensable if the aerodyne were provided with four reaction-jets instead of three, arranged at the tips of a cross-like airfoil structure. Nevertheless, even in this case, a simultaneous action on several orientable airfoils would remain interesting. Moreover, such a mixing-linkage is always indispensable to discriminate the action of the rolling control from that of the elevating control.

In the embodiment shown in Figure 5, the rod 12 (elevating control) actuates a bell-crank lever 65 pivoted around a fixed axis 66. The other end of said lever carries a pin 67 acting as a pivot for a swing bar 68 linked through connecting rods 69 and 70 to bell-crank levers 71 and 72 (pivoted around fixed axes 73 and 74) respectively. Lever 71 actuates the rod 10b controlling the orientable airfoil 2 extending obliquely towards the left. Lever 72 actuates the rod 10c controlling the orientable airfoil 2 extending obliquely towards the right.

The swing-bar 68 carries a bracket-arm 68a which is linked, through a connecting rod 75, with a lever 76 also pivoted around the fixed axis 66 and which is actuated by the rod 13 (rolling). The connecting rod 75 extends in a plane parallel to that containing the axes 66 and 67 and the length of the said connecting rod is equal to the distance between the said axes.

As a result, a pull exerted on the rod 12 lowers the swing-bar 68 while a push exerted thereon raises said arm. In other words, in both cases, angular displacements of equal values and same directions are imparted to both bell-crank levers 71 and 72 which results in displacing to the same extent and in the same direction both rods 10b and 10c. During this motion, the connecting rod 75, together with its end pivots and the axes 66 and 67, act as a parallel motion structure so that no reaction is exerted, neither upstream (rods 13 and 14) nor downstream (rods 10a), on the other controls.

However, when a pull or push is exerted, through rod 13, on the lever 76 (rolling) owing to the presence of the connecting rod 75, the swing arm 68 is tilted around the axis 67, so that connecting rods 69 and 70 are displaced in opposite directions, which results through the rods 10b and 10c in deflections of equal amplitude, but opposite directions of the oblique orientable airfoils.

Moreover, the lever 76 is linked through a connecting rod 77 with a crank-arm 78 pivoted around a fixed axis 79. A bell-crank lever 80 is also pivoted on the same axis 79 and one end of the said lever is linked, through a connecting rod 81, with the lever 82 actuated by the steering control (14). On the other end of the bell-crank lever 80, a second bell-crank lever 83 is mounted for pivoting in a plane parallel to that of the first one and has one of its arms linked through a connecting rod 84 with the crank-arm 78 and its other arm acting through a connecting rod 85 on a bell-crank lever 86 (comprising two separate levers interconnected through a tubular axle) which actuates, in turn, the rod 10a acting on the vertical orientable airfoil 2. Both connecting rods 75 and 84 are parallel to the plane containing the axis 79 and the pivoting axis 87 of the lever 83. The length of the connecting rod 84 is such that its two end articulations and the two axes 87 and 79 form a parallel motion structure.

Thus, owing to the presence of the connecting rod 77, the lever 76, when actuated (rolling control), causes tilting of the crank-arm 78 and, since the lever 80 remains stationary (if the rod 14 is not acted upon, then, from the steering-pedals), an action is exerted through the connecting rod 84 and the bell-crank lever 83 from the connecting rod 85 on the rod 10a controlling the vertical airfoil 2. It is clear, from the above description, that any action exerted on the rolling control thus results not only in opposite deflections of the side oblique airfoils 2, but also in a deflection of the vertical airfoil 2.

Conversely, if the rod 14 is acted upon, the bell-crank lever 80 is tilted through the connecting rod 81 which results in a displacement of the bell-crank lever 83. The latter actuates, on the one hand, the rod 10a and, on the other hand, the crank-arm 78 (reaction towards the rolling control). If the latter is held stationary, owing to the action of the parallel motion structure comprising the connecting rod 84 and the axes 79 and 87, the said action is only transmitted to the rod 10a. Thus, the rolling and steering controls are interdependent so that, whenever one of them is actuated, the pilot feels a reaction from the other one.

It is obvious that, when several rods are simultaneously actuated at the entry of the device, a resultant combined action is exerted on the exit rods.

In the device described with reference to Figure 4, as exposed above, the variations of the angles of incidence and side-slip are measured by means of wind-vanes. The use of such wind-vanes (unless they are designed to be retracted at high speeds, which by the way offers no drawback) may alter the stream-lined profile of the aerodyne. Consequently, it may be preferred to substitute therefore air intakes located on either side of the aerodyne and adapted to act on differential pressure-indicators.

In Figure 8, the location of such air intakes has been diagrammatically shown.

The air intakes 88a and 88b, diametrically opposed in a vertical plane, are capable, when connected with a differential pressure-indicator, to measure the angle of incidence while the air intakes 89a and 89b, also diametrically opposed but arranged in a cross-like configuration with respect to the first ones, are capable, when connected with a differential pressure-indicator, to measure the angle of side-slip. Still another air intake 37 has been shown in Figure 8 at the end of a longitudinal spur 90. The said intake is used to pick-up the overall pressure while a last intake 38, opening transversally, picks-up the static pressure.

The various above mentioned air intakes may be used in any suitable manner to generate, through appropriate amplifying devices, the forces to be transmitted to the various control rods 12, 13 and 14 for stabilizing purposes.

Figure 9A:
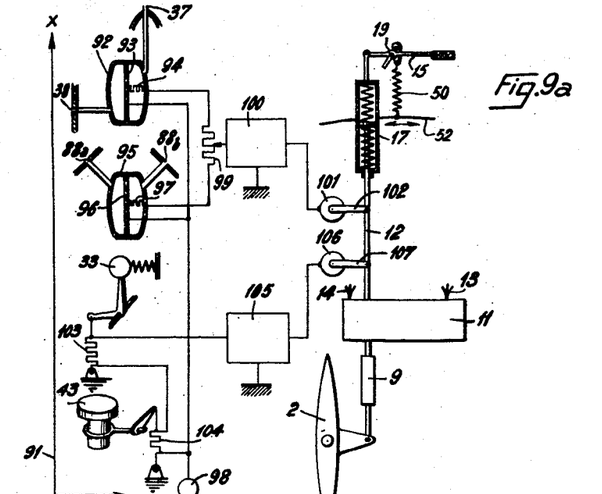
Figures 9a and 9b are diagrammatical views of modifications of the stabilizing system, the first one for pitch and the other for roll and yaw.
Figure 9B:
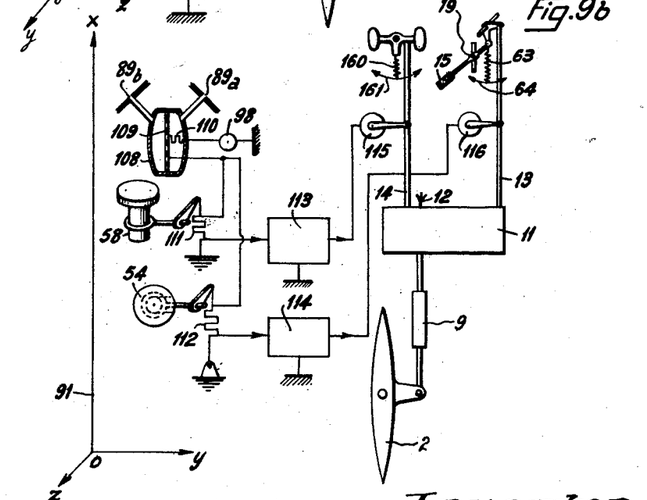

In Figures 9a and 9b, is diagrammatically shown an electrical embodiment of the stabilizing system. To indicate the location of the said system on the aerodyne, reference dihedrons 91, figurating the orientation of the various diagrammatically shown parts, have been indicated on the left-hand portions of Figures 9a and 9b. As usual, the direction OX is the longitudinal axis of the aerodyne, OZ is the vertical and OY the horizontal, the aerodyne being assumed to fly horizontally.

The air-intakes 37 and 38 lead to the respective compartments of a diaphragm box 92, the diaphragm of which is 93. The displacements of said diaphragm act upon a first resistance extensometer 94 (for example a resistance strain gauge). Similarly, the two air-intakes 88a and 88b are connected with the respective compartments of a diaphragm box 95 the diaphragm 96 of which acts upon a resistance extensometer 97. Both extensometers 94 and 97 are fed from a common current source 98. They are connected in opposition with a resistor 99.

At a suitably chosen tap of said resistor, the voltage is thus positive if the current prevails in one of the extensometers, negative in the opposite case and nil if the voltage drops through both extensometers balance each other.

The voltages thus picked-up may be amplified in an amplifier 100 and then fed into an electric apparatus 101, for example a motor the torque of which acts on a lever-arm 102 to actuate selectively the rod 102 in one or the other direction.

In this case, the weight 33 that measures the normal accelerations may be caused to act on an extensometer 103, while the pitch gyrometer 43 may be caused to act on an extensometer 104. The extensometers 103 and 104 are mounted in series to ensure accumulation of the voltage drops therethrough and the resulting voltage variations are fed through an amplifier 105 into a second electric motor 106 acting on the rod 12 through a lever arm 107. The relevant action is transmitted through the mixing linkage 11 and the irreversible jack 9 to the relevant orientable airfoil 2. Otherwise, the device may be designed and arranged as previously described.

Figure 9b shows a design of the roll and steering stabilizing means.

The air intakes 89a and 89b communicate with the respective compartments of a diaphragm-box 108, of which the diaphragm 109 acts on a resistance extensometer 110. The yaw gyrometer 58 and the roll gyrometer 54 respectively actuate extensometers 111 and 112. A current source 98 feeds in parallel the extensometers 111 and 112 through the extensometer 110. Thus, the amplifiers 113 and 114 receive resultant voltages respectively depending, on the one hand, on the side-slip angle and the yaw speed and on the other hand, on the side-slip angle and the roll speed. The corresponding amplified voltages are fed into the electric apparatus 115 and 116 respectively acting on the rods 14 and 13.

It will be understood that the pitch gyrometer 43 and the yaw gyrometer 58 may be replaced by one single gyrometer mounted on a swivel joint and, thus, capable of acting either on the extensometer 104 or on the extensometer 111, the latter being mounted at right angles to each other.

The general steps of a typical flight with the aerodyne according to the invention are given herebelow.

Figure 10:
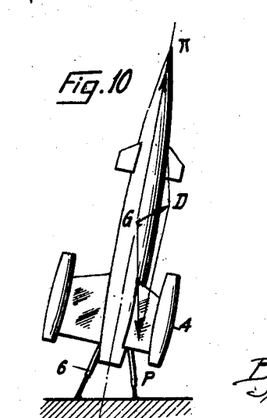
Figure 10 is a diagram of the force system acting on the aerodyne by take-off.

Before taking-off, as shown in Figure 10, the aerodyne is first slightly inclined with respect to the vertical. This may be obtained either by varying the length of the legs of the tripod 6, or, when the propelling reaction-jets are already started, by causing a slight tilting of the aerodyne by means of the pilot-stick 15. Then, the reaction jets 4 are accelerated to full rate, thus providing a thrust which, as mentioned in the preamble is superior to the weight of the aerodyne. G being the centre of gravity of the aerodyne, the thrust $\pi$ of its reaction-jets and its weight P give an ascending oblique resultant GD, so that the aerodyne tends to take-off in the direction of said resultant. As soon as the aerodyne has reached a certain speed, however slow with respect to the surrounding air, the stabilizing system becomes operative due to the action of the gyrometers, as well as owing to that of the devices responsive to the angle of incidence. In the case of a strong wind at low altitude, the aerodyne must be first inclined towards the direction of the wind so that, at the very instant of take-off, it has a certain incidence with respect to the wind, which intervenes for the stabilizing.

During this phase of flight at low speed, piloting takes place by orientation of the jets under the control of the above mentioned stabilizing system.

Figure 11:
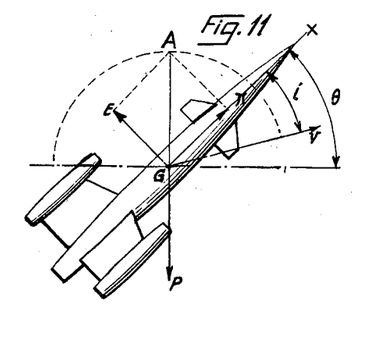
Figure 11 is a diagram of the force system acting on the aerodyne in normal flight.

In normal flight, as shown in Fig. 11, the aerodyne flying with a certain speed in the direction GV, there is provided an aerodynamic force GE adding its effect to the thrust $\pi$ to balance the weight P. A flight with a strong incidence may then take place with a thrust $\pi$ inferior to the weight. The reaction jets which had been speeded up to full rate by take-off may then be throttled down without any drawback as soon as normal flight has begun.

In a known manner, in order to obtain a maximum of thrust by take-off, it is preferred to use post-combustion reaction jets capable of generating, during a short time, a thrust sufficient to overcome the weight of the aerodyne. In Fig. 11 $i$ is the angle of incidence, the variation of which is measured by means of the previously indicated devices, $\theta$ is the trim angle of the aerodyne.

As the speed of flight increases, the aerodyne is tilted towards a horizontal flight attitude. It may be easily seen with reference to Figs. 11a and 11b that the behaviour of such an aerodyne with a strong incidence does not substantially differ from the behaviour of an usual aircraft.

Figures 11A, 11B, 12:
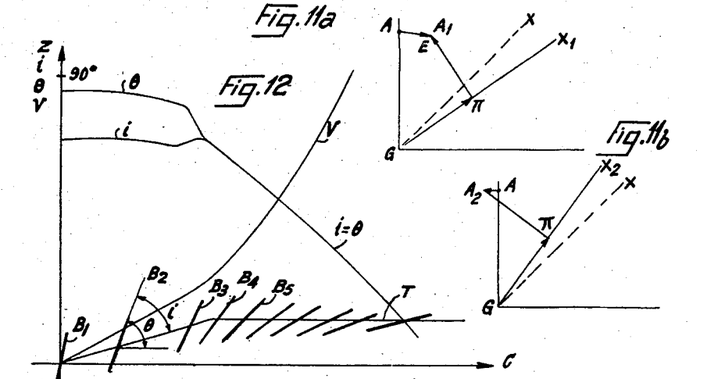
Figures 11a and 11b illustrate the variation of the force system of Figure 11, in response to modification of the incidence of the aerodyne.
Figures 12 and 13 are diagrams illustrating the successive positions of an aerodyne according to the invention, respectively by take-off and landing.

If, for example, from the flight attitude shown in Fig.

11, the aerodyne is brought to that diagrammatically shown in Fig. 11a, i. e. if the aerodyne is nosed-down, this results in a longitudinal acceleration AA1 of the aerodyne. Conversely, as shown in Fig. 11b, if the longitudinal axis of the aerodyne is tilted from the direction GX to the direction GX2, this results in a deceleration AA2.

Fig. 12 shows diagrammatically the successive take-off steps of an aerodyne according to the invention. The horizontal displacements C are plotted, in abscissae, and the altitudes Z, the angles of incidence $i$ and the longitudinal flight attitude $\theta$ and the speed V are plotted in ordinates.

During take-off, the centre of gravity of the aerodyne describes the path T while its longitudinal axis successively assumes the positions $B_1$, $B_2$, $B_3$, etc. The course is, first, ascending, if desired with a constant slope, to soon become horizontal. During the ascending part of the course, the speed V increases uniformly and, then, much more rapidly as the course becomes horizontal. During the first step, the angle $i$ and $\theta$ are different from each other, to be made equal as the course becomes horizontal. The angle of longitudinal flight attitude $\theta$ is nearly equal to 90° by take-off; it rapidly decreases as the aerodyne reaches the end of its ascending path and begins to nose down towards the horizontal; then it further progressively decreases during the whole tilting period.

Figure 13:
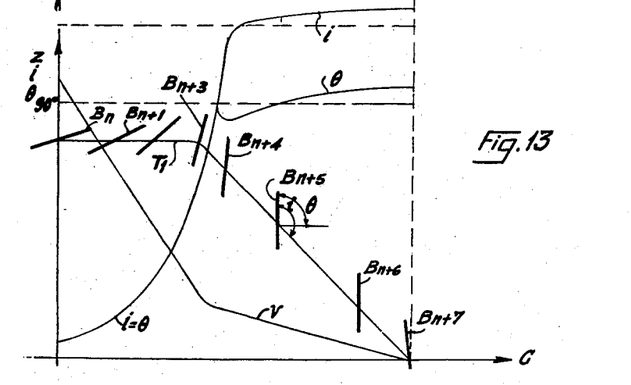

Fig. 13 shows, with the same symbols, the successive steps of landing.

At the end of its horizontal course (beginning of the path $T_1$), the aerodyne progressively noses up as indicated diagrammatically at $B_n$ to $B_n+3$. When it has assumed a substantially vertical position, it begins its descending path which, as by take-off, may be rectilinear but more oblique with respect to horizontal. In the same conditions, the speed V decreases very rapidly and then more slowly until the aerodyne touches the ground. Preferably, in the position $B_n+7$, corresponding to the first contact with the ground, the aerodyne is somewhat inclined rearwardly to compensate the residual horizontal speed. In this case, as shown in the drawing, the angles of incidence are greater than the angles of flight attitude, while, towards the ends of the path, the latter becomes higher than 90°.

While the invention has been described with particular reference to a preferred embodiment, it is not intended to limit the scope of the invention to the embodiment illustrated nor otherwise than the terms of the subjoined claims.

What is claimed is:

1. An aerodyne comprising an elongated fuselage, at least three adjustable airfoils angularly spaced in star-like configuration around said fuselage and pivotally mounted thereon about radial axes, in the vicinity of one of its ends, a reaction jet fixedly mounted along the tip edge of each one of said airfoils for orientation of its main axis in a plane substantially parallel to said fuselage longitudinal axis, complementary lifting fixed airfoils secured in the vicinity of the other end of said fuselage and piloting means to selectively adjust the angular positions of said adjustable reaction jet carrying airfoils.

2. An aerodyne according to claim 1, wherein the number of said adjustable airfoils is equal to three and wherein the same are angularly spaced around the fuselage by more than 90°, one of them furthermore extending in the bisecting plane of the external dihedron of the two other.

3. An aerodyne according to claim 1, wherein said fuselage offers the general shape of a spindle-like revolution body and wherein said adjustable and fixed airfoils are spaced by equal angles.

4. An aerodyne according to claim 3, comprising three adjustable and three fixed airfoils being shifted by 60° with respect to said adjustable airfoils, whereby any interference between the aerodynamic wakes of the various airfoils is avoided.

5. An aerodyne according to claim 3, further comprising means responsive to the angle of incidence of the aerodyne to vary the angular position of said adjustable airfoils as a monotonic function of the piloting means and means to automatically stabilize the aerodyne with an incidence predetermined by the deflection of said airfoils.

6. An aerodyne according to claim 5, wherein said adjustable airfoils are disposed in the vicinity of the tail of the aerodyne and wherein landing means are provided to support the aerodyne in a substantially vertical position on the ground.

7. An aerodyne according to claim 6, wherein said landing means are constituted by an adjustable shock-absorbing tripod.

8. An aerodyne according to claim 1, wherein the reaction jets carried by the adjustable airfoils are equally spaced from the longitudinal axis of the fuselage and have the same shape and size.

9. An aerodyne according to claim 1, further comprising irreversible servo-motors operatively connected with said adjustable airfoils and adapted to be actuated by said piloting means for steering, rolling and elevating purposes, and a stabilizing system operatively connected with said servo-motors and responsive to the flight parameters for correcting the steering, rolling and elevating control actions of said piloting means as a function of said parameters.

10. An aerodyne according to claim 9, wherein said irreversible servo-motors are constituted by hydraulic jacks having a control member and a controlled member, the displacement of said controlled member exerting no reaction on said control member.

11. An aerodyne according to claim 9, further comprising resilient means interposed between said piloting means and stabilizing system and adjustable compensating springs connected between said piloting means, and a fixed point on said aerodyne to counterbalance the reaction of said resilient means on said pilot means.

12. An aerodyne according to claim 11, wherein the law of variation of the action of the compensating springs is so chosen that the action of said piloting means causes monotonic variations of incidence of the aerodyne.

13. An aerodyne according to claim 1, further comprising stabilizing means operatively connected with said adjustable airfoils for elevating control purposes, said stabilizing means being responsive to the speed of flight of the aerodyne, its normal acceleration, its angle of incidence and the speed of variation of its pitch angle.

14. An aerodyne according to claim 1, further comprising stabilizing means operatively connected with said adjustable airfoils for rolling control purposes, said stabilizing means being responsive to the angle of side-slip of the aerodyne and the speed of variation of its roll angle.

15. An aerodyne according to claim 1, further comprising stabilizing means operatively connected with said adjustable airfoils for steering control purposes, said stabilizing means being responsive to the angle of side-slip of the aerodyne and the speed of variation of its yaw angle.

16. An aerodyne according to claim 1, further comprising stabilizing means operatively connected with said adjustable airfoils for elevating, rolling and steering purposes, said stabilizing means including gyrometers responsive to the speeds of variation of the pitch, roll and yaw angles of the aerodyne.

17. An aerodyne according to claim 1, further comprising stabilizing means operatively connected with said orientable airfoils for elevating, rolling and steering purposes, said stabilizing means including wind-vanes responsive to the angles of incidence and side-slip of the aerodyne.

18. An aerodyne according to claim 1, further comprising stabilizing means operatively connected with said orientable airfoils for elevating, rolling and steering purposes, said stabilizing means including differential pressure indicators and diametrically opposed obliquely opening air-intakes in the fuselage of said aerodyne for feeding said indicators with the surrounding air pressure.

19. An aerodyne according to claim 1, further comprising stabilizing means operatively connected with said adjustable airfoils for elevating control purposes, said stabilizing means including a cylinder, a piston slidably mounted in said cylinder, an overall pressure air-intake and a static pressure air-intake in the fuselage of said aerodyne, means to communicate each of said air-intakes with one of the compartments of said cylinder, and a linkage including a piston rod to operatively connect said piston with said adjustable airfoils.

20. An aerodyne according to claim 1, further comprising stabilizing means operatively connected with said adjustable airfoils for elevating control purposes, said stabilizing means including a spring loaded weight pivoted around a transverse axis on a fixed part of the aerodyne and a linkage to interconnect said weight with said adjustable airfoils.

21. An aerodyne according to claim 9, comprising means including a source of electric current to generate electrical effects and to vary said effects as a function of said flight parameters and means responsive to said electrical effects to exert on said adjustable airfoils stabilizing forces in response to actuation of said piloting means.

References Cited in the file of this patent

UNITED STATES PATENTS

| | | |
|---|---|---|
| 1,763,590 | Klemperer | June 10, 1930 |
| 1,851,797 | Almeida | Mar. 29, 1932 |
| 2,351,307 | Vorech | June 13, 1944 |
| 2,541,922 | Hosford | Feb. 13, 1951 |
| 2,712,420 | Amster | July 5, 1955 |
| 2,770,428 | Vogel | Nov. 13, 1956 |
| 2,774,556 | Robert | Dec. 18, 1956 |

FOREIGN PATENTS

| | | |
|---|---|---|
| 657,557 | France | Jan. 16, 1929 |
| 852,599 | France | Oct. 30, 1939 |